H. C. DODGE.
HOSE RACK.
APPLICATION FILED MAR. 15, 1910.
980,217.
Patented Jan. 3, 1911.
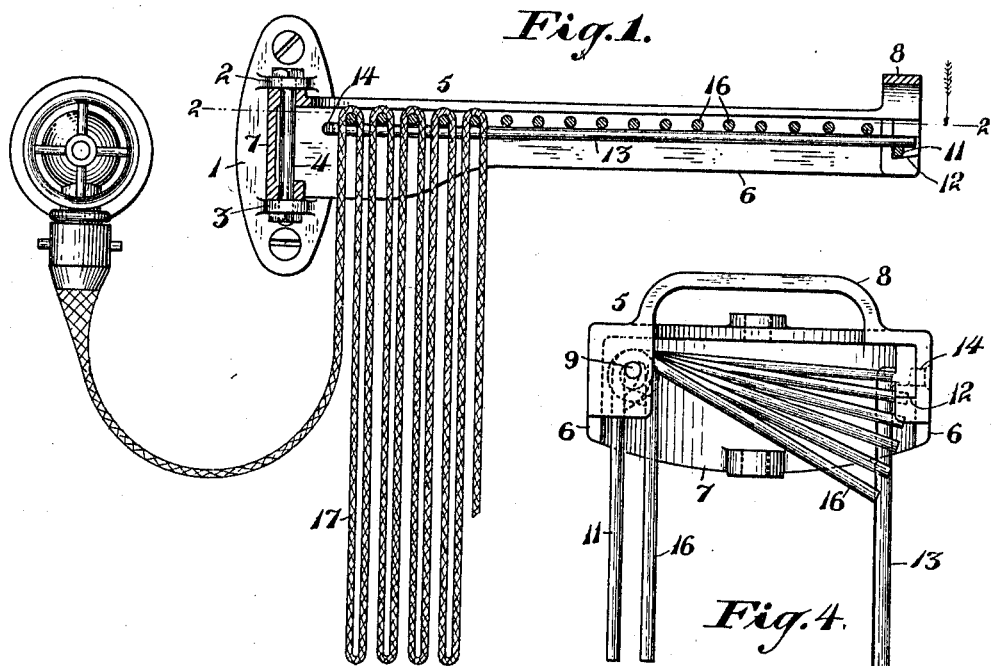
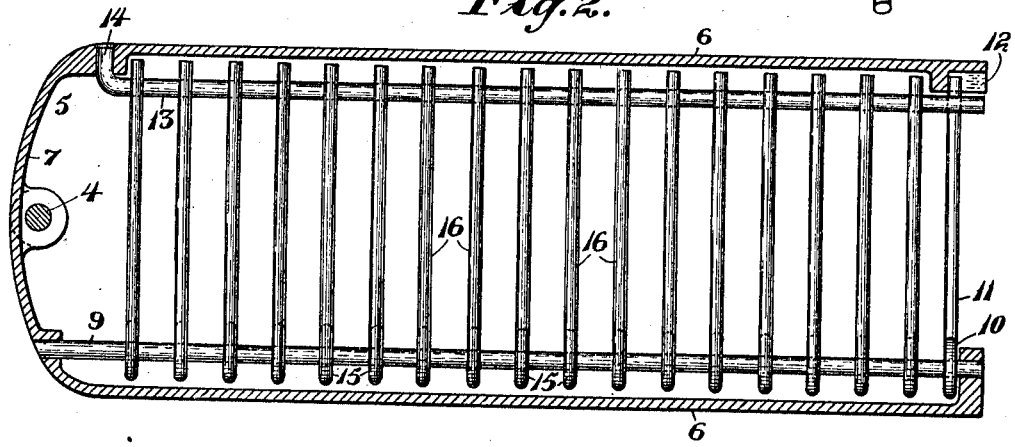
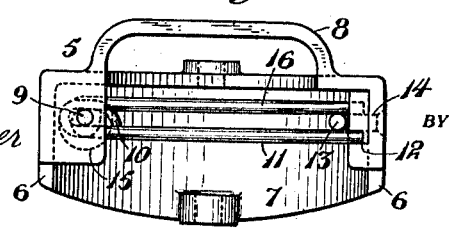
WITNESSES:
J. H. Fliedner
N. B. Keating
INVENTOR
Harold C. Dodge
BY
F. M. Wright
ATTORNEY

UNITED STATES PATENT OFFICE.

HAROLD C. DODGE, OF SAN FRANCISCO, CALIFORNIA.

HOSE-RACK.

980,217.  Specification of Letters Patent.  Patented Jan. 3, 1911.

Application filed March 15, 1910. Serial No. 549,501.

*To all whom it may concern:*

Be it known that I, HAROLD C. DODGE, a citizen of the United States, residing at San Francisco, in the county of San Francisco and State of California, have invented new and useful Improvements in Hose-Racks, of which the following is a specification.

My invention relates to improvements in racks for fire hose, its object being to provide a rack of this character by which the folds of the hose when released will drop in regular succession, and in which accidental release of the hose will be avoided.

In the accompanying drawing, Figure 1 is a front view, partly in section of the device, part of a hose suspended therefrom being omitted; Fig. 2 is a horizontal section on the line 2—2 of Fig. 1; Fig. 3 is an end view; Fig. 4 is an end view of the device, showing the several positions of the rack pins in the act of falling.

Referring to the drawing, 1 indicates a bracket having upper and lower arms 2, 3, through the ends of which is passed a vertical bolt 4. Pivoted on said bolt between said arms is one end of a rack frame 5, comprising sides 6 joined at their inner ends by the yoke 7 by which the frame is pivoted to the bolt, and at their outer ends by a bridge 8. On the under side of the frame is secured at one side thereof a longitudinal rail 9, around the outer end of which is a loop 10 of a stop pin 11. Said stop pin extends across the rack frame, and its end rests upon a shoulder 12 sloping slightly upward to the free end of the rack frame. Upon said stop pin rests the free end of a longitudinal rod 13, pivoted at 14 in the inner end of the rack frame. Pivoted upon said rail 9 by the loops 15 are a number of rack pins 16, the free ends of which rest upon the rod 13.

In use, the hose, shown at 17, hangs in folds over the rack pins 16. The last loop of the hose to which the nozzle is attached is folded over the stop pin 11. By giving a pull upon the nozzle, this stop pin 11 is pulled off the shoulder 12 and drops, thereby releasing the rod 13 and all the rack pins 16 supported thereon, which drop, turning on their pivots, one after the other in succession. The several folds of the hose then slide from off the rack pins as they drop. This is an important feature of my invention, as it avoids the dropping of the hose in an irregular heap or pile.

An advantage of the invention is that when the hose falls, all of the pins, both the stop pin, and the rack pins, are retained in position on the rack, conveniently for further use. A further advantage is that, with this form of rack, it is not necessary that the operator should run the full length of the hose in order to release the whole of the hose from the rack and thus turn on the water. I am aware, however, that I am not the first to use a hose in which the whole of the hose is released without the operator running its full length, but, in prior devices in which this is done, the pins for supporting the several folds of the hose are made in a single casting, rendering it extremely inconvenient to replace the hose in position. A further advantage attendant upon my improvement is that the hose is held very securely against accidental displacement, first, because the displacement of the stop pin is resisted by the upwardly sloping shoulder, and, second, because the several folds of the hose cannot be displaced longitudinally from off the rack pins, being retained against such displacement by the rod 13 and the side of the frame.

I claim:—

1. The combination of a rack frame, a longitudinal rail secured thereto, rack pins having loops through which said rail passes, a pivoted longitudinal rod extending along the side of the rack frame opposite the rail, and supporting the ends of said rack pins, and a stop pin having a loop through which the rail passes, and supporting the free end of the longitudinal arm, the rack frame having a shoulder upon which the free end of the stop pin rests, substantially as described.

2. The combination of a rack frame, a longitudinal rail secured thereto, rack pins having loops through which said rail passes, a pivoted longitudinal rod extending along the side of the rack frame opposite the rail, and supporting the ends of said rack pins, and a stop pin having a loop through which the rail passes, and supporting the free end of the longitudinal arm, the rack frame having a shoulder inclining upwardly outward, substantially as described.

In testimony whereof I have hereunto set my hand in the presence of two subscribing witnesses.

HAROLD C. DODGE.

Witnesses:
F. M. WRIGHT,
D. B. RICHARDS.